(12) United States Patent
Kurokawa et al.

(10) Patent No.: US 12,554,757 B2
(45) Date of Patent: Feb. 17, 2026

(54) SYSTEM AND METHOD OF SUPPORTING QUESTION ANSWERING USING LARGE LANGUAGE MODELS

(71) Applicant: Hitachi, Ltd., Tokyo (JP)

(72) Inventors: Yoshiki Kurokawa, Tokyo (JP); Kazuhiko Mogi, Tokyo (JP); Norifumi Nishikawa, Tokyo (JP); Daiki Takao, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 19/056,927

(22) Filed: Feb. 19, 2025

(65) Prior Publication Data

US 2025/0378096 A1 Dec. 11, 2025

(30) Foreign Application Priority Data

Jun. 6, 2024 (JP) ................. 2024-092195

(51) Int. Cl.
*G06F 7/00* (2006.01)
*G06F 16/334* (2025.01)
(Continued)

(52) U.S. Cl.
CPC ........ *G06F 16/3344* (2019.01); *G06F 40/242* (2020.01); *G06F 40/289* (2020.01); *G06F 40/40* (2020.01)

(58) Field of Classification Search
CPC ............ G06F 16/3347; G06F 16/3344; G06F 16/332; G06F 16/24542; G06F 16/2455; G06F 16/24522; G06F 16/2456; G06F 16/2465; G06F 16/2471; G06F 16/24575; G06F 16/2453; G06F 16/2457; G06F 16/215; G06F 16/243; G06F 16/244; G06F 16/245; G06F 16/248; G06F 16/93; G06F 16/285; G06F 16/9535; G06F 16/3329; G06F 16/90332; G06F 16/90335; G06F 16/217; G06F 16/353; G06F 40/289; G06F 40/242; G06F 40/40; G06F 40/30;
(Continued)

(56) References Cited

U.S. PATENT DOCUMENTS

2017/0242915 A1* 8/2017 Torisawa ............ G06F 16/3329
2019/0258939 A1 8/2019 Min et al.
(Continued)

FOREIGN PATENT DOCUMENTS

JP 2021-515310 A 6/2021

*Primary Examiner* — Mohammad A Sana
(74) *Attorney, Agent, or Firm* — MATTINGLY & MALUR, PC

(57) ABSTRACT

An overlap amount is defined for each document type. For each document, a system cuts the document into a plurality of document chunks according to the overlap amount corresponding to the type of document, and if the document type of the document is a predetermined document type, for each document type, the system associates the document chunk with a dictionary chunk that contains descriptions about a word that matches a word in the document chunk. When the system receives a user question, the system generates and provides an answer by inputting the question, as well as a document chunk identified based on the question and a dictionary chunk which the document chunk is associated with, into an LLM.

8 Claims, 12 Drawing Sheets

(51) Int. Cl.
*G06F 40/242* (2020.01)
*G06F 40/289* (2020.01)
*G06F 40/40* (2020.01)

(58) Field of Classification Search
CPC .... G06F 40/205; G06F 40/105; G06F 40/106; G06F 40/186; G06F 40/211
See application file for complete search history.

(56) References Cited

U.S. PATENT DOCUMENTS

| | | | |
|---|---|---|---|
| 2021/0382881 A1* | 12/2021 | Ishikawa | G06F 40/30 |
| 2023/0273961 A1* | 8/2023 | Mitani | G06F 16/90332 |
| | | | 707/722 |
| 2025/0147993 A1* | 5/2025 | Chen | G06F 16/9024 |
| 2025/0181620 A1* | 6/2025 | Lipka | G06F 40/30 |
| 2025/0211549 A1* | 6/2025 | Arunachalam | H04L 51/02 |

* cited by examiner

SYSTEM AND METHOD OF SUPPORTING QUESTION ANSWERING USING LARGE LANGUAGE MODELS

CROSS-REFERENCE TO PRIOR APPLICATION

This application relates to and claims the benefit of priority from Japanese Patent Application number 2024-092195, filed on Jun. 6, 2024 the entire disclosure of which is incorporated herein by reference.

BACKGROUND

The present invention relates generally to data management, and in particular to data management that supports question answering using large language models.

With the development of LLMs (Large Language Models), chatbots are known as applications that use LLMs. A chatbot receives a question described in a natural language, inputs the question to an LLM, obtains an answer described in a natural language from the LLM, and provides the obtained answer. Chatbots have been developed for specific applications such as call center assistance for specific businesses.

Japanese Translation of PCT Application No. 2021-515310 discloses a technique for question answering about documents.

SUMMARY

A characteristic of LLMs is that there is always a possibility of presenting incorrect information with a certain probability. For this reason, accuracy of LLM answers is not necessarily high.

One technique to improve the accuracy of answers using an LLM is called RAG (Retrieval-Augmented Generation). RAG reduces the possibility of presenting incorrect information by inputting a sentence (an example of information retrieved using a user-input question) on which an answer is based and the user-input question together to the LLM (in other words, by making the user's question input to the LLM a question for which an answer is originally known).

One important factor in the use of RAG is how to obtain a sentence on which an answer is based.

Trade-offs are known with respect to chunks which are sentences on which the answers are based. Specifically, for example, the performance of the chatbot varies with an amount of overlap between chunks when converting an original document into a plurality of chunks, each of which is a piece of a partial document. For example, if the overlap amount is too large, noise with respect to the question will increase. If the overlap amount is too small, the meaning of the sentences will not be connected between the chunks and accuracy of the answers will decrease. In particular, in the case of a document of which the content is divided into small sections and the correlation between the sections is low such as a command manual (command line manual), the overlap between chunks is noisy.

For this reason, even when chatbots are prepared for specific applications as described above, expected accuracy of chatbot answers is not achieved and chatbots tend to be used less frequently.

An object of the present invention is to improve the accuracy of answers provided with respect to user questions using an LLM.

An overlap amount is defined for each document type. For each document, a system cuts the document into a plurality of document chunks according to the overlap amount corresponding to the type of document, and if the document type of the document is a predetermined document type, for each document type, the system associates the document chunk with a dictionary chunk that contains descriptions about a word that matches a word in the document chunk. When the system receives a user question, the system generates and provides an answer by inputting the question, as well as a document chunk identified based on the question and a dictionary chunk which the document chunk is associated with, into an LLM.

According to the present invention, the accuracy of answers provided with respect to user questions using an LLM can be improved.

DESCRIPTION OF EMBODIMENTS

Figure 1:
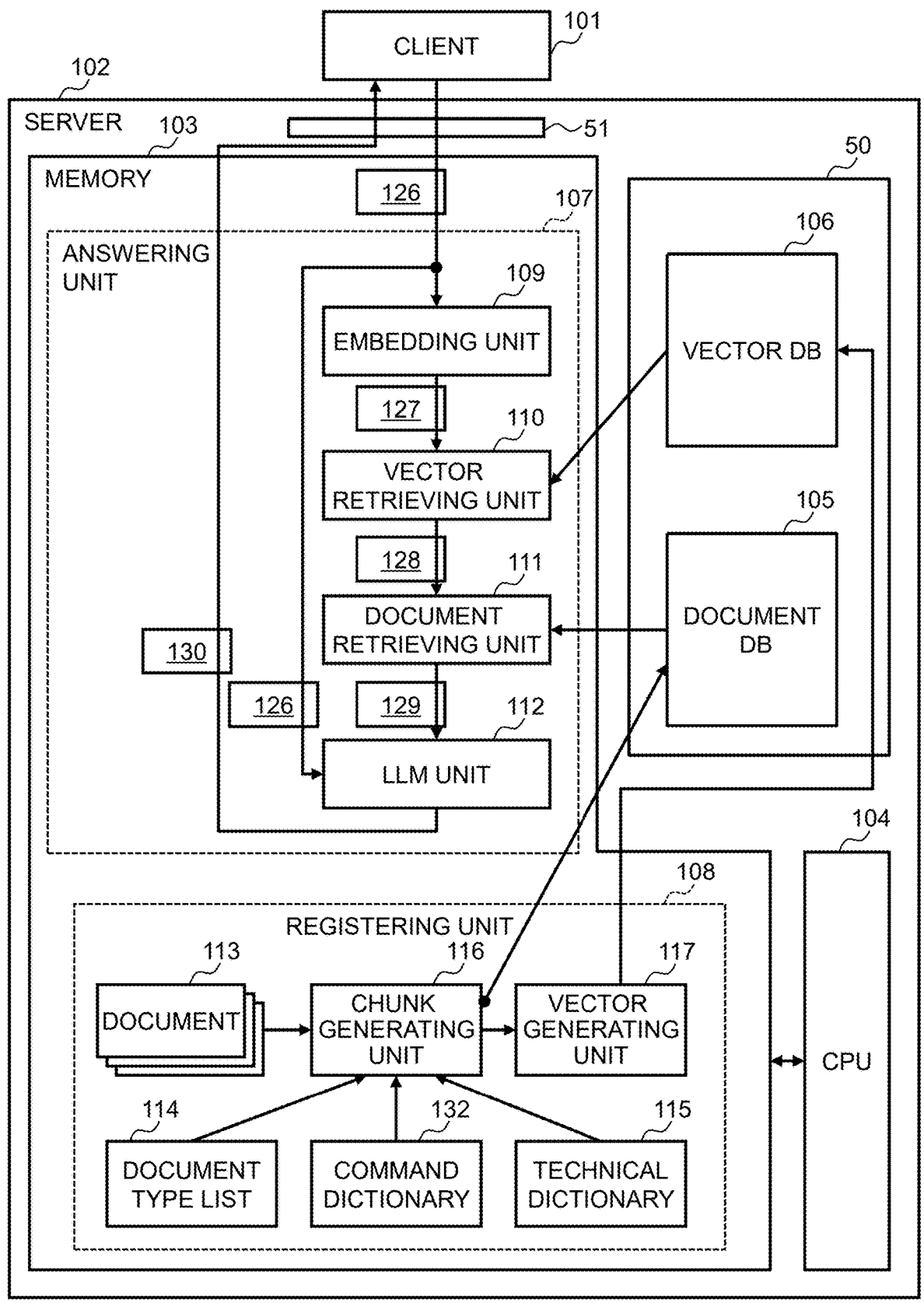
FIG. 1 is a configuration diagram of an entire system according to a first embodiment.

Hereinafter, embodiments will be described with reference to the drawings.

In the following description, an "interface apparatus" may be one or more interface devices. The one or more interface devices may be at least one of the following.

An I/O (Input/Output) interface apparatus that is one or more I/O interface devices. An I/O (Input/Output) interface device is an interface device with respect to at least one of an I/O device and a remote display computer. An I/O interface device with respect to a display computer may be a communication interface device. The at least one I/O device may be any of a user interface device such as an input device including a keyboard and a pointing device and an output device such as a display device.

A communication interface apparatus that is one or more communication interface devices. The one or more communication interface devices may be one or more communication interface devices of a same kind (for example, one or more NICs (Network Interface Cards)) or two or more communication interface devices of different kinds (for example, an NIC and an HBA (Host Bus Adapter)).

In addition, in the following description, a "memory" is one or more memory devices that are an example of one or more storage devices and may typically be a main storage device. The at least one memory device in a memory may be volatile memory devices or non-volatile memory devices.

In addition, in the following description, a "persistent storage apparatus" may be one or more persistent storage devices that are an example of one or more storage devices. The persistent storage device may be, typically, a non-volatile storage device (for example, an auxiliary storage device) and may specifically be, for example, an HDD (Hard Disk Drive), an SSD (Solid State Drive), an NVME (Non-Volatile Memory Express) drive, or an SCM (Storage Class Memory).

In addition, in the following description, a "storage apparatus" may be at least a memory among a memory and a persistent storage apparatus.

Furthermore, in the following description, a "processor" may be one or more processor devices. While at least one processor device may typically be a microprocessor device such as a CPU (Central Processing Unit), the processor device may be a processor device of a different kind such as a GPU (Graphics Processing Unit). The at least one processor device may be single-core or multi-core. The at least one processor device may be a processor core. The at least one processor device may be a processor device in the broad sense such as a circuit (for example, an FPGA (Field-Programmable Gate Array), a CPLD (Complex Programmable Logic Device), or an ASIC (Application Specific Integrated Circuit)) which is a collection of gate arrays implemented by a hardware description language and which performs a part of or all of the processing.

Furthermore, in the following description, while a function will be described using expressions such as a "yyy unit", a function may be realized when one or more computer programs are executed by a processor, may be realized by one or more hardware circuits (for example, an FPGA or an ASIC), or may be realized by a combination thereof. In a case where a function is realized when a program is executed by a processor, since prescribed processing is performed while using a storage apparatus and/or an interface apparatus or the like as appropriate, the function may be considered at least a part of the processor. Processing described using a function as a subject may be considered processing performed by a processor or an apparatus including the processor. A program may be installed from a program source. For example, the program source may be a program distribution computer or a computer-readable storage medium (for example, a non-transitory storage medium). The description of each function is merely an example and a plurality of functions may be consolidated into a single function or a single function may be divided into a plurality of functions.

In addition, although information that enables an output to be obtained in response to an input will be described below using expressions such as an "xxx DB" (DB stands for database), the information may be data of any structure (including structured data or unstructured data) or may be a machine learning model such as a neural network that generates an output with respect to an input, a genetic algorithm, or a random forest. Therefore, an "xxx DB" can be referred to as "xxx information". In addition, in the following description, the configuration of each DB is merely an example and a single DB may be divided into two or more DBs or all of or a part of two or more DBs may constitute a single DB.

A first embodiment will be described with reference to FIGS. 1 to 11.

FIG. 1 is a configuration diagram of an entire system according to the first embodiment of the present invention.

A client computer (hereinafter, a client) 101 is coupled to a server computer (hereinafter, a server) 102 so as to be capable of communication via, for example, a communication network. The server 102 includes an interface apparatus 51, a persistent storage apparatus 50, a memory 103, and a CPU 104 (an example of a processor) coupled thereto. While the server 102 is a physical computer system (one or more physical computers) in the present embodiment, the server 102 may be a logical computer system (for example, a virtual server or a cloud computing system based on a physical computer system). A vector DB 106 and a document DB 105 are stored in the persistent storage apparatus 50. At least a part of the DBs 106 and 105 may be in-memory databases or, in other words, may be stored in the memory 103 instead of the persistent storage apparatus 50.

A program is executed by the CPU 104. The program is stored in the memory 103. Functions such as an answering unit 107 and a registering unit 108 are realized as the program is executed by the CPU 104. The answering unit 107 includes an embedding unit 109, a vector retrieving unit 110, a document retrieving unit 111, and an LLM unit 112. The registering unit 108 includes a chunk generating unit 116 and a vector generating unit 117.

The client 101 may be a computer independent of the server 102. The client 101 transmits a user question 126 to the server 102 and receives an answer 130 to the question 126.

The server 102 may be an independent computer. The server 102 receives the question 126 from the client 101, performs answer processing to be described below, and consequently returns the answer 130 to the client 101.

The memory 103 is a component that constitutes the server 102. The memory 103 stores a program and in-process data. A predetermined result is obtained by having the CPU 104 perform processing using the program and data.

The CPU 104 performs processing prescribed by the program stored on the memory 103. In doing so, the CPU 104 reads the in-process data also stored on the memory 103 and necessary data from the persistent storage apparatus 50 as needed, and processes the data.

Figure 2:
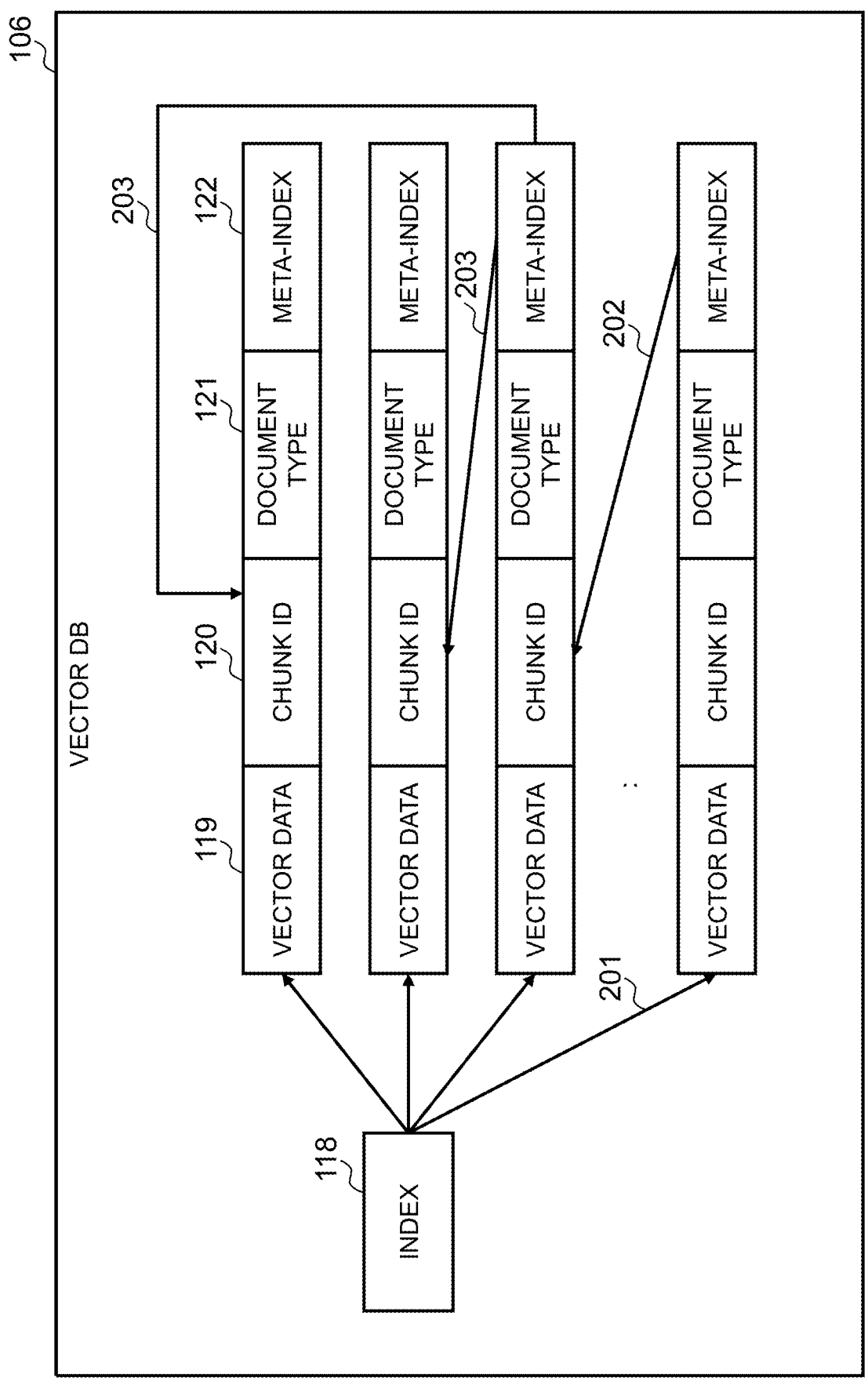
FIG. 2 is a configuration diagram of a vector DB according to the first embodiment.

The vector DB 106 is a DB of vectors (vector data). For example, as shown in FIG. 2 the vector DB 106 includes an index 118 and has an entry for each vector. Each entry includes data such as a vector 119, a chunk ID 120, a document type 121, and a meta-index 122. The index 118 includes a neighborhood index 201 that is a link to the vector 119. The chunk ID 120 represents an ID of a chunk that corresponds to the vector 119. The document type 121 represents a type of an original document 113 of the chunk. The meta-index 122 includes the chunk ID 120 that corresponds to another vector 119. In other words, as will be described later, in each vector 119 in the vector DB 106, a chunk corresponding to the vector 119 is a fragment document 123 as fragment data of the document 113, a fragment command dictionary (specifically, a manual 403 to be described later) as fragment data of a command dictionary 132 (see FIG. 5), or a fragment technical dictionary (specifically, an explanatory text 503 to be described later) as fragment data of a technical dictionary 115 (see FIG. 6). Therefore, the fragment document 123 corresponding to a chunk ID 124 that matches the chunk ID 120, the manual 403 corresponding to the chunk ID 402 that matches the chunk ID 120, or the explanatory text 503 corresponding to a chunk ID 502 that matches the chunk ID 120 can be acquired using the chunk ID 120. Note that the manual 403 in the command dictionary 132 is a duplicate of the fragment document 123 cut from the document 113 as a command manual (command line manual) as described later.

Figure 3:
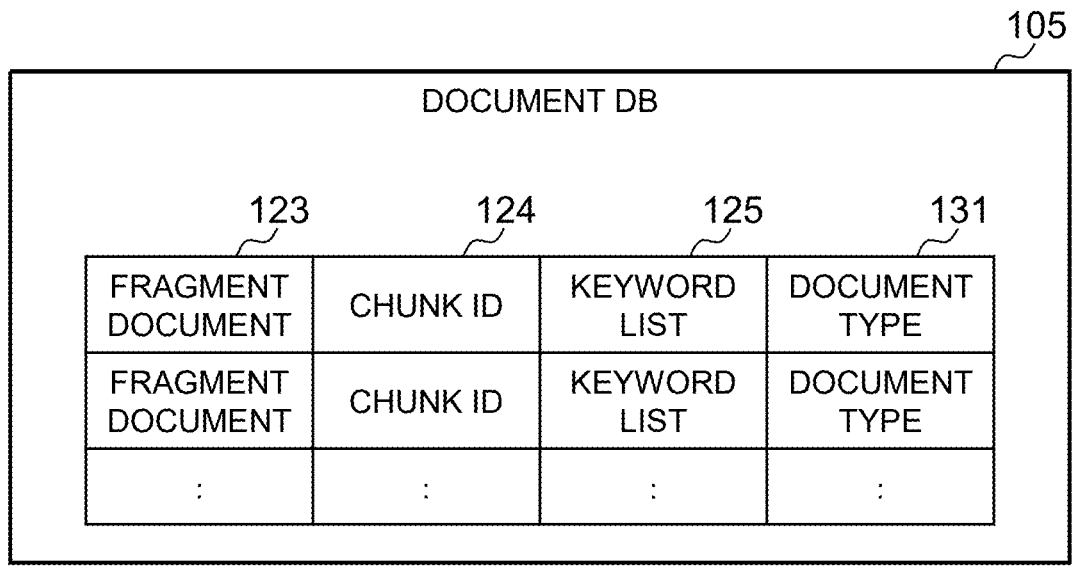
FIG. 3 is a configuration diagram of a document DB according to the first embodiment.

The document DB 105 is an ID of the document 113. For example, as shown in FIG. 3, the document DB 105 has an entry for each chunk of the document 113 and each entry includes data such as the fragment document 123, the chunk ID 124, a keyword list 125, and a document type 131. The fragment document 123 is fragment data of the document 113. The chunk ID 124 represents an ID of the fragment document 123. The keyword list 125 represents keywords included in the fragment document 123. The document type 131 represents a type of the original document 113 of the fragment document 123.

The answering unit 107 generates an answer 130 from the question 126 from the client 101 through answer processing and outputs the answer 130. The registering unit 108 creates data to be stored in the document DB 105 and stores the created data in the document DB 105, or creates data to be stored in the vector DB 106 and stores the created data in the vector DB 106.

Components of the answering unit 107 will now be described.

The embedding unit 109 is a type of language processing function that generates an embedding vector 127. Accordingly, a sentence in the question 126 input from the client 101 is converted into a multi-dimensional vector value that is the embedding vector 127.

The vector retrieving unit 110 retrieves, from the vector DB 106, the vector (vector data) 119 in the neighborhood of the embedding vector 127 created by the embedding unit 109. The vector retrieving unit 110 retrieves the found vector 119 together with the chunk ID 120, the document type 121, and the meta-index 122 in the entry containing the vector 119. The vector retrieving unit 110 outputs a candidate list 128 that is a list of chunk IDs 120 of vectors 119 ranked in order of proximity to the embedding vector 127. The candidate list 128 is an example of a list of chunk IDs 120 of vectors 119 of which a relationship with the embedding vector 127 satisfies a predetermined condition. The "predetermined condition" may include elements other than a distance between vectors. In addition, for each vector 119, the candidate list 128 may include at least one of the document type 121 and the meta-index 122 in addition to the chunk ID 120.

The document retrieving unit 111 retrieves from the document DB 105, for each chunk ID 120 in the candidate list 128, the fragment document 123 and/or the keyword list 125 corresponding to the chunk ID 124 that matches the chunk ID 120. The document retrieving unit 111 outputs a candidate sentence 129 including each retrieved fragment document 123.

The LLM unit 112 generates the answer 130 using an LLM (Large Language Model). LLM is a generic term for a language model for text generation. An answer can be generated with respect to an input question. Basically, while answers are generated based on knowledge obtained in learning of the LLM, it is impossible to generate correct answers to all questions. Therefore, as described above, there is a technique called Retrieval-Augmented Generation (RAG) or, more specifically, a technique to improve the accuracy of answers by inputting a sentence containing an answer to a question to an LLM together with the question as a technique for improving accuracy of answers. In the present embodiment, RAG is applied to the server 102. Therefore, the LLM unit 112 obtains the answer 130 with an improved correct answer rate by inputting the candidate sentence 129 to the LLM together with the question 126 from the client 101.

The answering unit 107 operates as follows.

The answering unit 107 converts the question 126 issued from the client 101 into the embedding vector 127 and retrieves the vector 119 in the neighborhood of the embedding vector 127 from the vector DB 106. For each of one or a plurality of found neighborhood vectors 119, the answering unit 107 acquires the chunk ID 120, the document type 121, and the meta-index 122 corresponding to the vector 119. If there is the document type 121 representing a "command manual" or "specifications", the answering unit 107 acquires the chunk ID 120 of an entry linked to the meta-index 122 in an entry (row) containing the document type 121. Alternatively, if there is the document type 121 representing "construction and operation guide case studies", the answering unit 107 acquires a first chunk ID 120 linked to the meta-index 122 in an entry containing the document type 121 and a second chunk ID 120 linked to the meta-index 122 in an entry containing the first chunk ID 120 or, in other words, acquires a two-step chunk ID 120. The answering unit 107 generates the candidate list 128 containing these chunk IDs 120.

As described above, the candidate list 128 includes the chunk ID of the vector 119 in the neighborhood of the embedding vector 127 and may include a chunk ID from the meta-index 122 of a chunk specified from the chunk ID (a chunk ID of a chunk related to a given chunk).

For each chunk ID 120 in the candidate list 128, the answering unit 107 retrieves a chunk ID (124, 402, or 502) that matches the chunk ID 120 and acquires a chunk (the fragment document 123, the manual 403, or the explanatory text 503) in an entry containing the found chunk ID. The answering unit 107 obtains the answer 130 from the LLM by inputting the candidate sentence 129 including each acquired chunk to the LLM together with the question 126. In this manner, the answering unit 107 generates the answer 130 using the LLM. The answering unit 107 returns the answer 130 to the client 101.

Components of the registering unit 108 will now be described.

One or a plurality of chunks can be obtained from the document (data) 113 and each chunk can be the source of information for the answer 130.

A document type list 114 is a list (data) representing, for each document 113, a type of the document 113. While examples of document types include a "command manual", "construction and operation guide case studies", "minutes", "specifications", and other documents (for example, a technical dictionary), a part of these document types (for example, "minutes") need not be available.

The technical dictionary 115 is a collection (data) of explanatory sentences on technical terms and may include, for each term, a content and a keyword.

The command dictionary 132 is a collection (data) of command words and may include, for each command word, a chunk ID of a chunk in which the command word is described.

For each document 113, the chunk generating unit 116 identifies a document type of the document 113 from the document type list 114, determines a document cutting method according to the identified document type, and the document 113 is cut into a plurality of fragment documents 123 using the determined document cutting method. The chunk generating unit 116 allocates, for each fragment document 123, a chunk ID as an identification number of the fragment document 123 (IDs need not be limited to numbers).

At this point, when the document type of the document 113 is "command manual" or "specifications", the chunk generating unit 116 performs keyword extraction, and when the extracted keyword is registered in the technical dictionary 115, the chunk generating unit 116 registers the extracted keyword in the keyword list 125 of the fragment document 123 having the keyword. In addition, the chunk generating unit 116 extracts a command word and registers the command word in the command dictionary 132 together with a chunk ID of the fragment document 123 having the command word.

When the document type of the document 113 is "construction and operation guide case studies", the chunk generating unit 116 determines whether the command word described earlier is registered in the fragment document 123 and, if so, registers the command word as a keyword in the keyword list 125. In addition, for each term in the technical dictionary 115, the chunk generating unit 116 identifies a chunk ID of a chunk having the term and registers the identified chunk ID in the technical dictionary 115.

For each fragment document created in this manner, the chunk generating unit 116 registers the fragment document 123, the chunk ID 124, the keyword list 125, and the document type 131 in the document DB 105.

The vector generating unit 117 uses the data (the fragment document 123, the chunk ID 124, the keyword list 125, and the document type 131) registered in the document DB 105 by the chunk generating unit 116. First, the vector generating unit 117 generates the vector 119 of the fragment document 123. In addition, when the document type 131 of the fragment document 123 is "command manual" or "specifications", the vector generating unit 117 searches for a keyword that matches a keyword in the keyword list 125 from the technical dictionary 115 and acquires a chunk ID of the keyword from the technical dictionary 115. Furthermore, the vector generating unit 117 registers the created vector 119, the chunk ID 120 of the chunk, the document type 121 of the chunk, and the meta-index 122 including the chunk ID acquired from the technical dictionary 115 in the vector DB 106.

Due to the chunk generating unit 116 and the vector generating unit 117 described above, the document DB 105 and the vector DB 106 can be set up so that the answering unit 107 operates properly.

Refer to FIG. 2. In the vector DB 106, the index 118 is information for retrieving a neighborhood vectors from the vector DB 106 at high speed. The vector 119 is a vector data body and is used for neighborhood calculations. The chunk ID 120 represents an ID of a chunk corresponding to the vector 119 and is used to identify a chunk corresponding to the vector 119 selected as a result of vector retrieval. The document type 121 is data indicating a type of an original document of the chunk corresponding to the vector 119. The meta-index 122 includes a chunk ID of each of one or a plurality of chunks to which the chunk corresponding to the vector 119 relates.

Refer to FIG. 3. In the document DB 105, the fragment document 123 is a chunk created by the chunk generating unit 116. The chunk ID 124 represents a chunk ID assigned when the fragment document 123 was generated by the chunk generating unit 116. The keyword list 125 is a list of keywords included in the fragment document 123. The document type 131 is data indicating a type of the original document 113 of the fragment document 123.

According to the present embodiment, the candidate sentence 129 that is submitted to the LLM together with the question 126 is more likely to include explanations and the like of words in the command manual, and as a result, the likelihood of getting a comprehensible answer 130 even if the user is not familiar with terminology increases. In addition, since ease of reference of the command manual is improved, the likelihood of improving accuracy (quality) of the answer 130 (explanation) such as procedures for using commands increases.

Hereinafter, data and functions in the server 102 will be described with reference to FIGS. 2 to 7.

FIG. 2 is a configuration diagram of the vector DB 106 according to the first embodiment;

A neighborhood index 201 is provided as a link. In addition, a guide index 202 and/or a terminology index 203 may be provided as links.

The neighborhood index 201 is a link from the index 118 to the vector 119. The neighborhood index 201 is strung from the index 118 to each vector 119 so that the neighborhood calculation can extract vectors 119 in the neighborhood at high speed according to a predetermined index algorithm.

The guide index 202 is a link that is strung from the meta-index 122 corresponding to the vector 119 of a chunk of which the document type 121 is "construction and operation guide case studies" to the chunk ID 120 of another chunk.

The terminology index 203 is a link that is strung from the meta-index 122 corresponding to the vector 119 of a chunk of which the document type 121 is "command manual" or "specifications" to the chunk ID 120 of another chunk.

By stringing indexes 201 to 203 in this manner, related sentences can be promptly made into a list when creating a list of higher-level neighborhood vectors from a group of neighborhood vectors.

FIG. 3 is a configuration diagram of the document DB 105 according to the first embodiment. The configuration of the document DB 105 is as described above.

Figure 4:
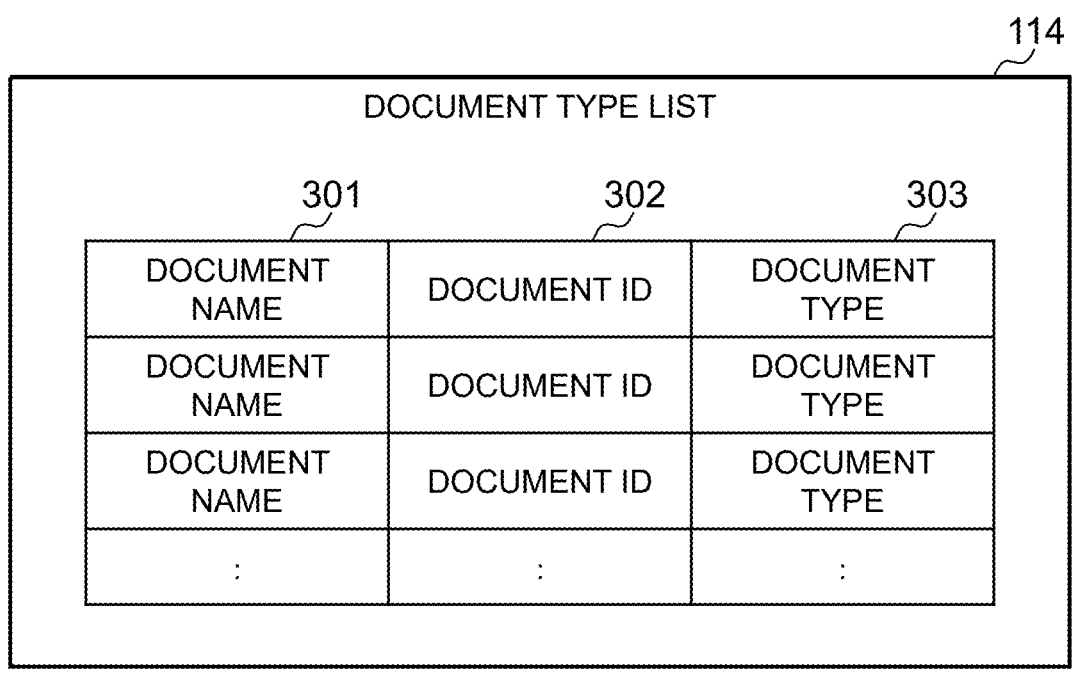
FIG. 4 is a configuration diagram of a document type list according to the first embodiment.

FIG. 4 is a configuration diagram of the document type list 114 according to the first embodiment.

The document type list 114 has an entry for each document 113 and each entry includes data such as a document name 301, a document ID 302, and a document type 303.

The document name 301 represents a name of the document 113. The document ID 302 represents an ID of the document 113. The document type 303 represents a document type of the document 113.

Adopting the configuration described above enables a document type to be allocated to each document to be registered in the present system.

Figure 5:
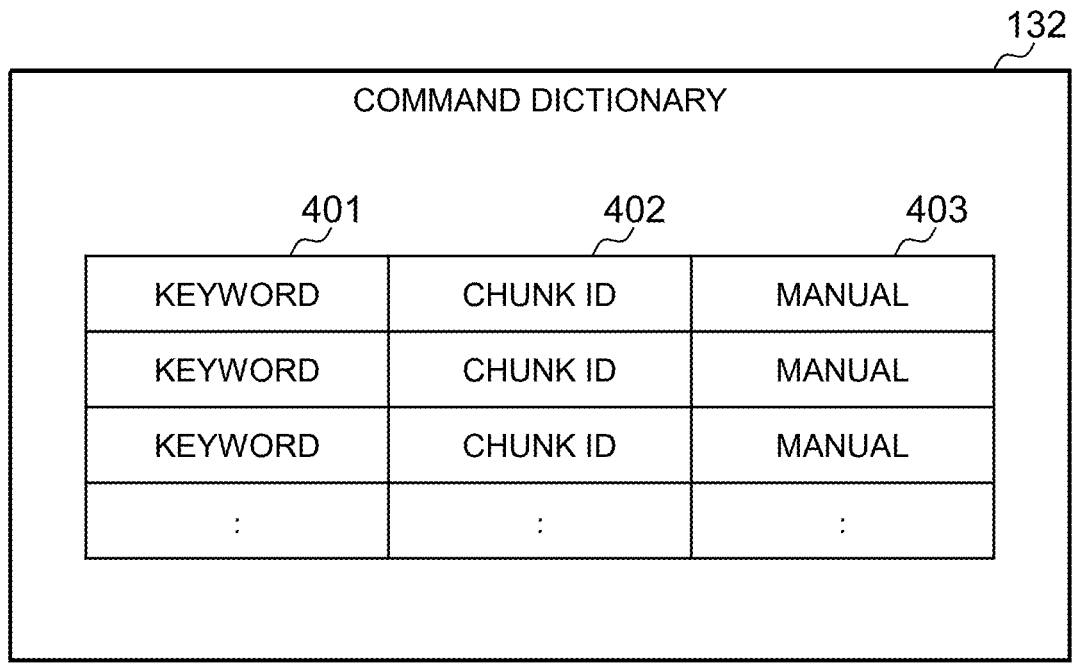
FIG. 5 is a configuration diagram of a command dictionary according to the first embodiment.

FIG. 5 is a configuration diagram of the command dictionary 132 according to the first embodiment.

The command dictionary 132 includes, for each command word, data such as a keyword 401, the chunk ID 402, and the manual 403.

The keyword 401 represents a command word. The chunk ID 402 represents an ID of a chunk which is cut out from a command manual and which includes the command word. The manual 403 is a fragment document cut out from the command manual.

Adopting the configuration described above enables a related sentence and a chunk ID of the related sentence to be obtained from a command word.

Figure 6:
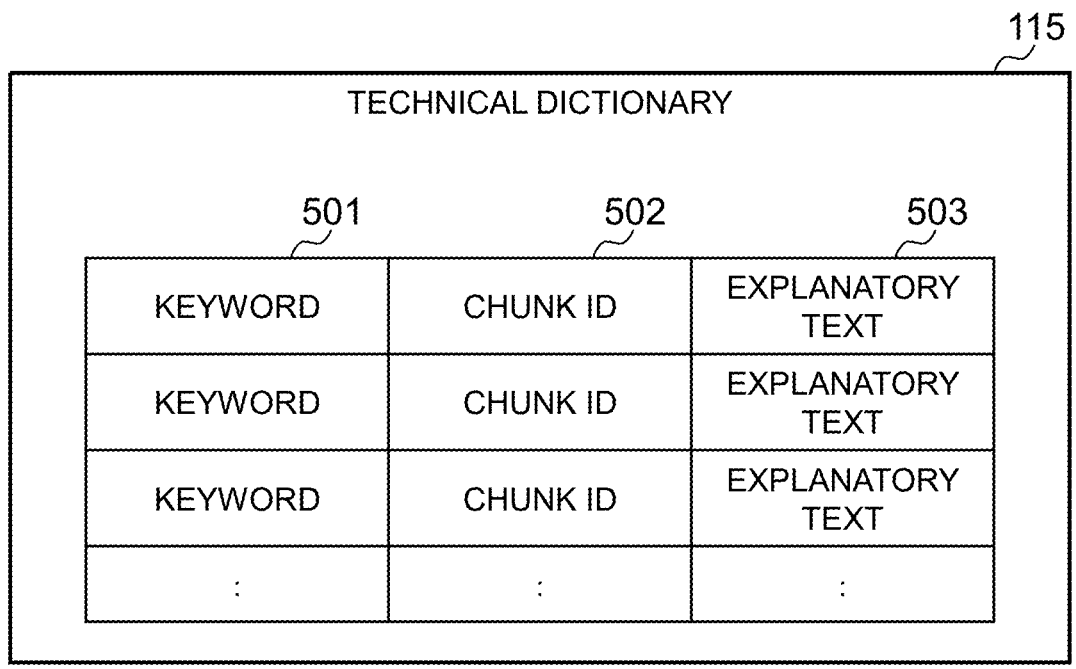
FIG. 6 is a configuration diagram of a technical dictionary according to the first embodiment.

FIG. 6 is a configuration diagram of the technical dictionary 115 according to the first embodiment.

The technical dictionary 115 includes, for each technical term, data such as a keyword 501, the chunk ID 502, and the explanatory text 503.

The keyword 501 represents a technical term. The chunk ID 502 represents an ID of a chunk (explanatory text of a term) including an explanation of the technical term. The explanatory text 503 represents the chunk (explanatory text of a term) of the technical dictionary 115.

Adopting the configuration described above enables a related sentence and a chunk ID of the related sentence to be obtained from a technical term.

Figure 7:
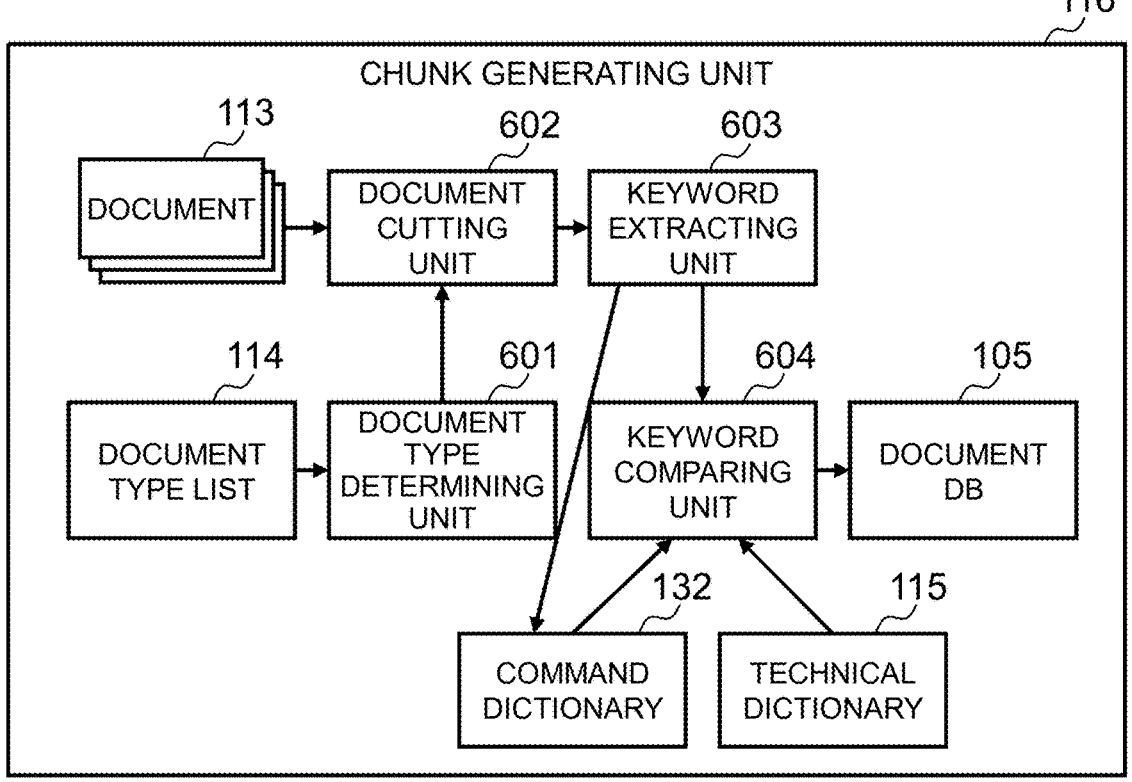
FIG. 7 is a functional block diagram of a chunk generating unit according to the first embodiment.

FIG. 7 is a functional block diagram of the chunk generating unit 116 according to the first embodiment.

The chunk generating unit 116 includes a document type determining unit 601, a document cutting unit 602, a keyword extracting unit 603, and a keyword comparing unit 604.

The document type determining unit 601 extracts the document type 303 of a presently-processed document ("object document" in the description of FIG. 7) 113 among one or a plurality of documents 113 from the document type list 114 and passes the document type 303 to the document cutting unit 602.

The document cutting unit 602 cuts the object document 113 by a cutting method in accordance with the document type 303 from the document type determining unit 601. Specifically, for example, when the document type 303 represents a "command manual", "construction and operation guide case studies", or "specifications", the document cutting unit 602 cuts the object document 113 into a plurality of fragment documents 123 according to an organization of chapters and sections with no overlapping of cutting boundaries. In addition, for example, when the document type 303 represents "minutes" or another type, the document cutting unit 602 cuts the object document 113 so as to be separated by the punctuation mark "." of the sentence into chunks of a predetermined size or a similar size and the cutting boundaries overlap in a predetermined size.

The keyword extracting unit 603 extracts, for each cut fragment document 123, a keyword from the fragment document 123. As an example of an extraction method, a sentence can be broken down into parts of speech, and keywords can be determined and extracted based on whether or not the part of speech is a noun (in particular, a proper noun).

The keyword comparing unit 604 compares, for each fragment document 123, the extracted keyword with the keyword 501 (technical term) registered in the technical dictionary 115. When there is a matching keyword 501, the keyword comparing unit 604 registers the keyword 501 in the keyword list 125 that corresponds to the fragment document 123. In addition, when the document type 303 represents "construction and operation guide case studies", the keyword comparing unit 604 compares, for each fragment document 123, the keyword extracted from the fragment document 123 with the keyword 401 (command word) registered in the command dictionary 132. When there is a matching keyword 401, the keyword comparing unit 604 registers the keyword 401 in the keyword list 125 that corresponds to the fragment document 123. The keyword comparing unit 604 registers the keyword list 125 created in this manner in the document DB 105 together with the fragment document 123 created by the document cutting unit 602, the chunk ID 124 of the fragment document 123, and the document type 131 of the fragment document 123 (a duplicate of the document type 303).

By the series of operations described above, the chunk generating unit 116 constructs the document DB 105 based on the document 113, the document type list 114, the command dictionary 132, and the technical dictionary 115.

Figure 8:
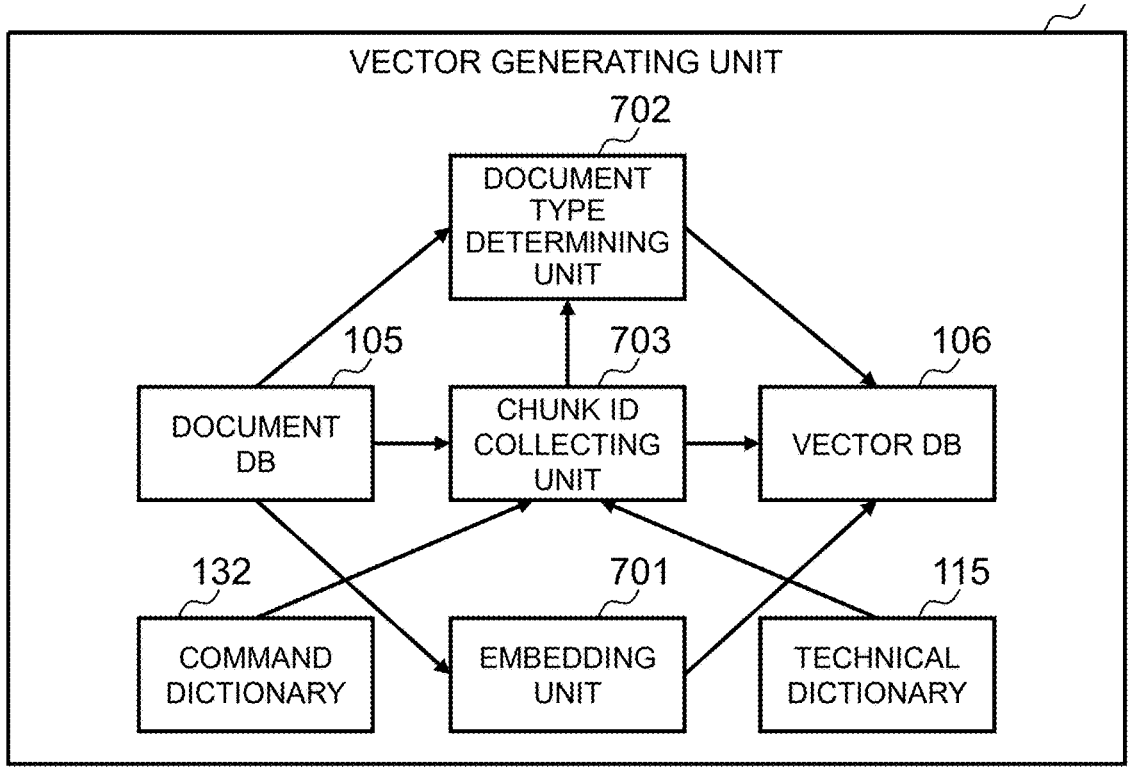
FIG. 8 is a functional block diagram of a vector generating unit according to the first embodiment.

FIG. 8 is a functional block diagram of the vector generating unit 117 according to the first embodiment.

The vector generating unit 117 includes an embedding unit 701, a document type determining unit 702, and a chunk ID collecting unit 703.

The embedding unit 701 may have the same function as the embedding unit 109. The embedding unit 701 outputs a vector of certain dimensions from the fragment document 123 (sentence) that is input. Specifically, for example, the embedding unit 701 reads the fragment document 123 from the document DB 105 and uses it as input, and registers an output vector in the vector DB 106.

The document type determining unit 702 reads the document type 121 corresponding to the fragment document 123 input to the embedding unit 701 from the document DB 105 and passes the document type 121 to the chunk ID collecting unit 703.

The chunk ID collecting unit 703 reads the keyword list 125 corresponding to the fragment document 123 input to the embedding unit 701 from the document DB 105 and, for each keyword in the keyword list 125, compares the keyword with the command dictionary 132 and/or the technical dictionary 115. The chunk ID collecting unit 703 records the chunk ID 402 and/or the chunk ID 502 of the keyword 401 and/or the keyword 501 having matched the keyword, and registers data including all chunk IDs obtained with respect to all keywords in the vector DB 106 as the meta-index 122.

By operating as described above, the data in the document DB 105, the command dictionary 132, and the technical dictionary 115 can be used as input to align and register data to be registered in the vector DB 106.

Figure 9:
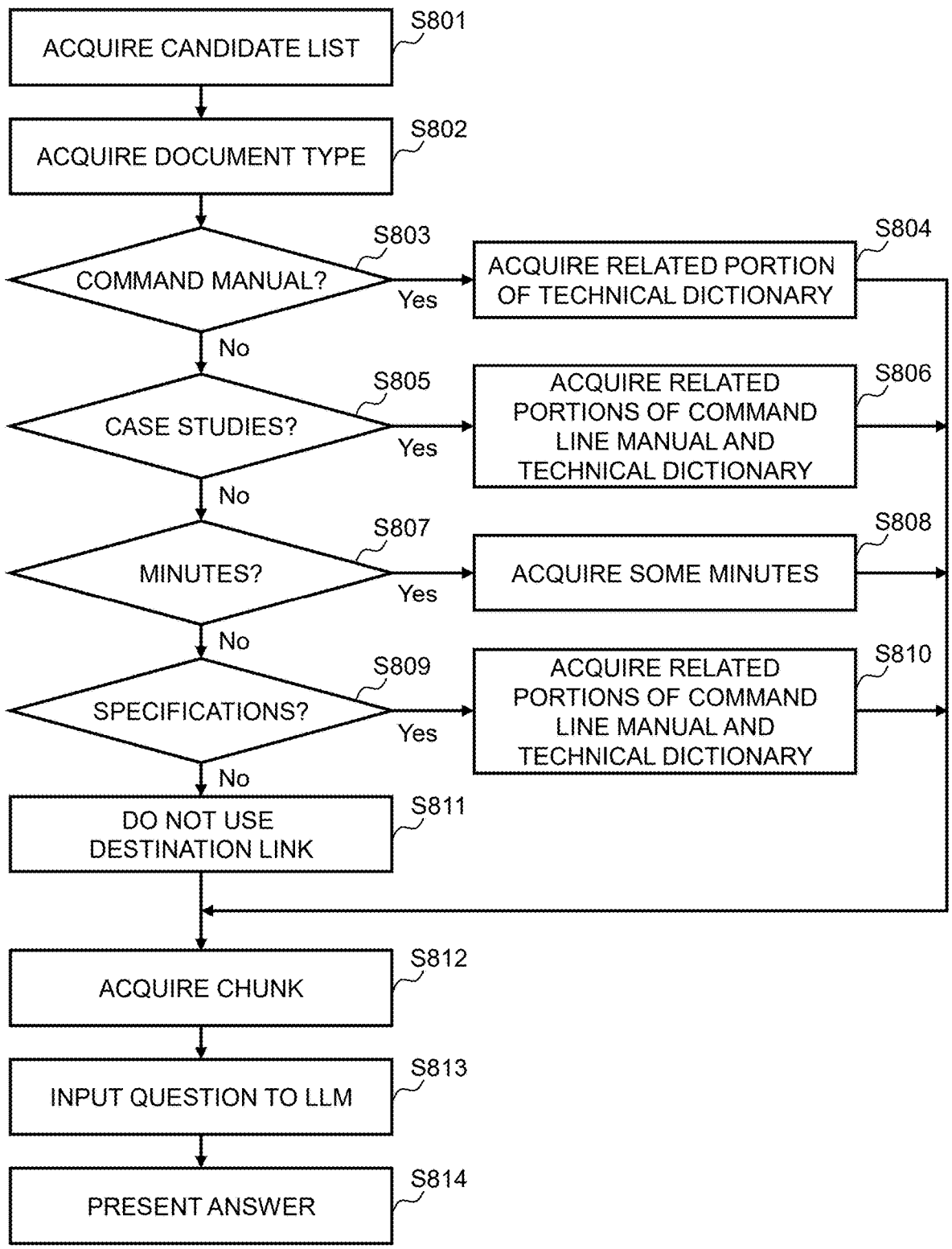
FIG. 9 is a flow chart of answer processing according to the first embodiment.

FIG. 9 is a flow chart of registration processing according to the first embodiment.

In S801, the answering unit 107 converts the question 126 input from the client 101 into the embedding vector 127, retrieves the neighborhood vector 119 from the vector DB 106 using the embedding vector 127, and creates the candidate list 128 including the chunk ID 120 corresponding to the found neighborhood vector 119.

In S802, the answering unit 107 acquires the document type 121 corresponding to the chunk ID 120 in the candidate list 128.

In S803, the answering unit 107 determines whether or not the document type 121 acquired in S802 is a "command manual". When the determination result of S803 is Yes, in S804, the answering unit 107 acquires the chunk ID 502 included in the meta-index 122 corresponding to the document type 121 (the chunk ID 502 of the related portion (explanatory text 503) of the technical dictionary 115 linked to the meta-index 122).

When the determination result of S803 is No, in S805, the answering unit 107 determines whether or not the document type 121 acquired in S802 is "construction and operation guide case studies". When the determination result of S805 is Yes, in S806, the answering unit 107 acquires the chunk ID 402 included in the meta-index 122 corresponding to the document type 121 (the chunk ID 402 of the manual 403 linked to the meta-index 122). When the meta-index 122 corresponding to the chunk ID 402 (manual 403) has the chunk ID 502 of the related portion (explanatory text 503) of the technical dictionary 115 linked to the meta-index 122, the answering unit 107 also acquires the chunk ID 502.

When the determination result of S805 is No, in S807, the answering unit 107 determines whether or not the document type 121 acquired in S802 is "minutes". When the determination result of S807 is Yes, in S808, the answering unit 107 acquires the chunk ID included in the meta-index 122 corresponding to the document type 121 (the chunk ID of previous or next minutes (chunk) linked to the meta-index 122). Note that as described above, in the present embodiment, minutes need not be available as a document type (document) and, therefore, S807 and S808 may be omitted. In addition, S807 and S808 may be performed after S809: No.

When the determination result of S807 is No, in S809, the answering unit 107 determines whether or not the document type 121 acquired in S802 is "specifications". When the determination result of S809 is Yes, in S810, the answering unit 107 acquires the chunk ID 402 included in the meta-index 122 corresponding to the document type 121 (the chunk ID 402 of the manual 403 linked to the meta-index 122). When the meta-index 122 corresponding to the chunk ID 402 (manual 403) has the chunk ID 502 of the related portion (explanatory text 503) of the technical dictionary 115 linked to the meta-index 122, the answering unit 107 also acquires the chunk ID 502.

When the determination result of S809 is No, since the document type 121 represents another document, in S811, the answering unit 107 does not use the meta-index 122.

All branches are consolidated in S812. In S812, for each acquired chunk ID, the answering unit 107 acquires a chunk (the fragment document 123, the manual 403, or the explanatory text 503) identified from the chunk ID. Next, in S813, the answering unit 107 submits the candidate sentence 129 containing the acquired chunk (the fragment document 123, the manual 403 or the explanatory text 503) to the LLM together with the question 126. Accordingly, in S814, the answering unit 107 obtains the answer 130 and presents the answer 130 to the client 101 in response to the question 126.

Figure 10:
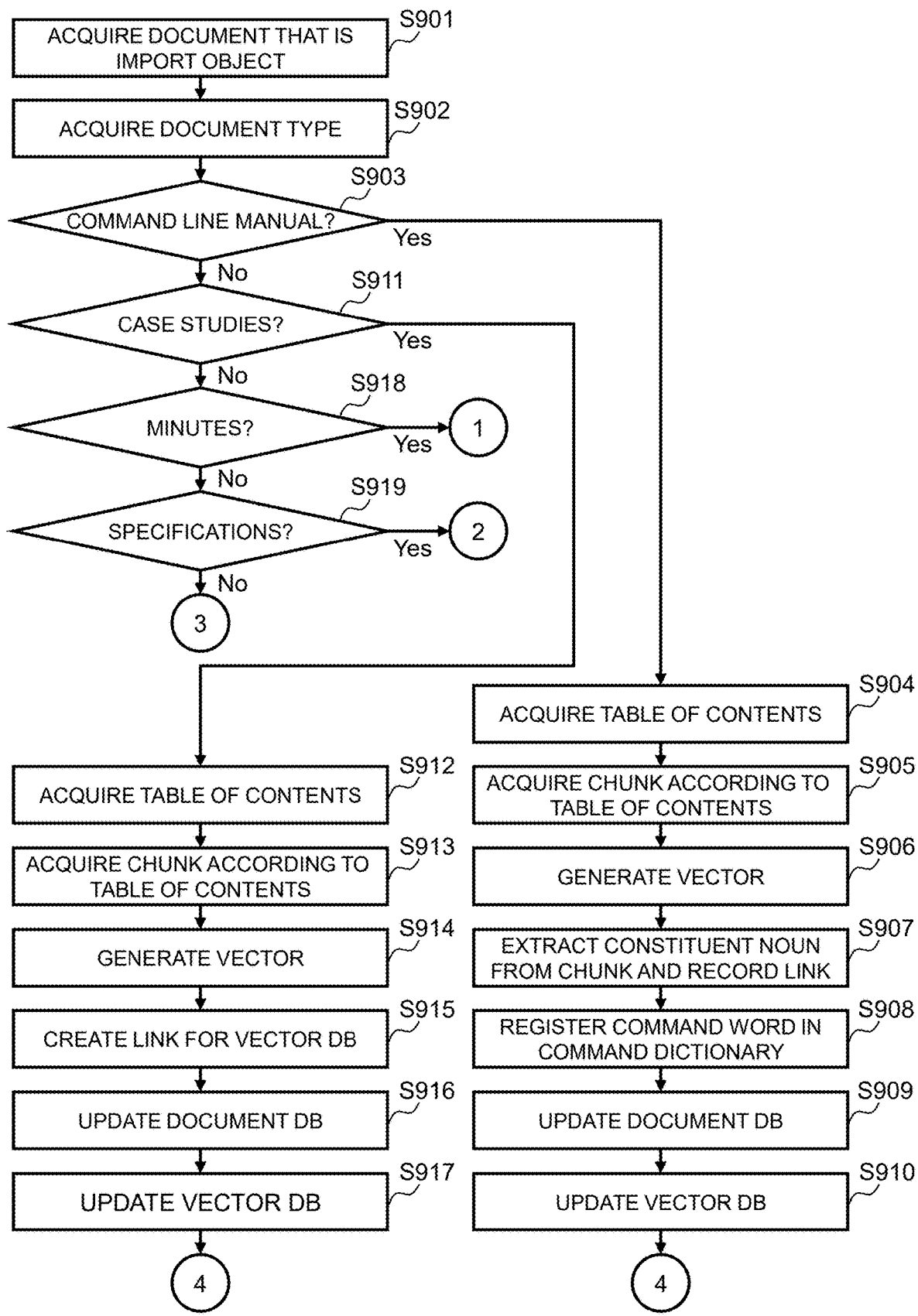
FIG. 10 is a part of a flow chart of registration processing according to the first embodiment.
Figure 11:
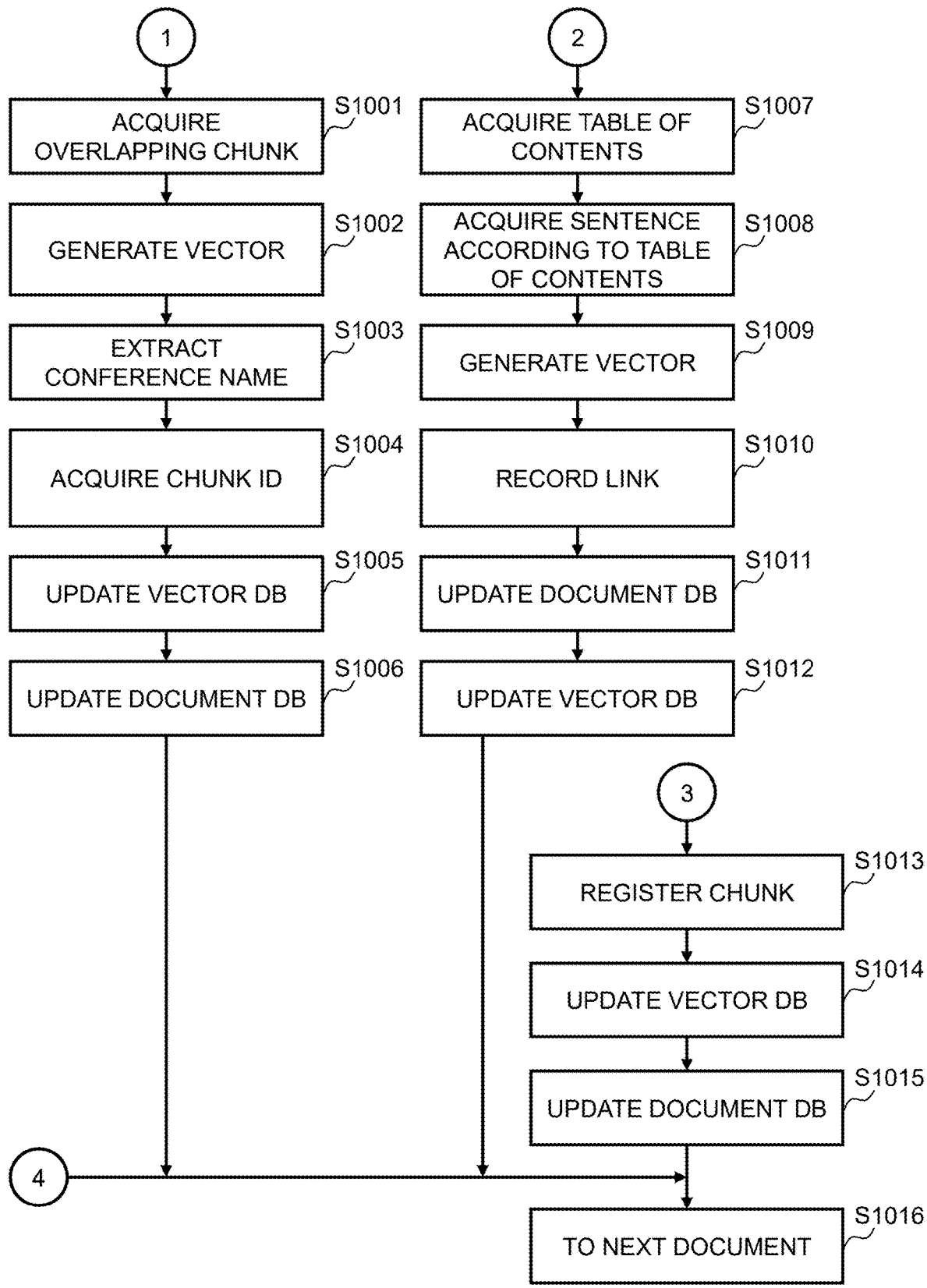
FIG. 11 is a remainder of the flow chart of registration processing according to the first embodiment.

FIGS. 10 and 11 are a flow chart of registration processing according to the first embodiment.

In S901, the registering unit 108 acquires a document (an object document in the description of FIGS. 10 and 11) 113 to be imported. Next, in S902, using the document ID of the object document 113 as a key, the registering unit 108 acquires the document type 303 from the document type list 114.

In S903, the registering unit 108 determines whether or not the document type 303 is a "command manual". When the determination result of S903 is Yes, in S904, the registering unit 108 acquires a table of contents, an organization of chapters, and an organization of sections from the object document 113. Next, in S905, the registering unit 108 cuts the object document 113 along the organization of sections in the table of contents and stores a plurality of chunks (a plurality of fragment documents 123) of the object document 113 into the document DB 105. At this point, the registering unit 108 generates a chunk ID with respect to each chunk. Next, in S906, with respect to each chunk, the registering unit 108 generates the vector 119 from the chunk and saves the vector 119 in the vector DB 106. Next, in S907, with respect to each chunk, the registering unit 108 cuts out a keyword (for example, a noun) from the chunk, retrieves whether the keyword 501 matching the keyword is registered in the technical dictionary 115, and if registered, records the chunk ID 502 (link) corresponding to the keyword 501 in, for example, the memory 103. Next, in S908, the registering unit 108 cuts out a command word from sections in the table of contents and registers the command word in the command dictionary 132. Next, in S909, the answering unit 107 registers the fragment document (chunk) 123, the chunk ID 124, the keyword list 125, and the document type 131 in the document DB 105. Next, in S910, the registering unit 108 registers the vector 119, the chunk ID 120, the document type 121, and the meta-index 122 (including the recorded chunk ID (link)) in the vector DB 106. Subsequently, processing advances to S1016 in FIG. 11.

When the determination result of S903 is No, in S911, the registering unit 108 determines whether or not the document type 303 is "construction and operation guide case studies". When the determination result of S903 is Yes, in S912 to S914, the registering unit 108 performs same processing as S904 to S906. In S915, with respect to each chunk, the registering unit 108 cuts out a keyword (for example, a noun) from the chunk, retrieves whether the keyword 401 matching the keyword is registered in the command dictionary 132, and if registered, records the chunk ID 402 (link) corresponding to the keyword 401. In S916, the answering unit 107 registers the fragment document (chunk) 123, the chunk ID 124, the keyword list 125, and the document type 131 in the document DB 105. Next, in S917, the registering unit 108 registers the vector 119, the chunk ID 120, the document type 121, and the meta-index 122 (including the recorded chunk ID (link)) in the vector DB 106. Subsequently, processing advances to S1016 in FIG. 11.

When the determination result of S911 is No, in S918, the registering unit 108 determines whether or not the document type 303 is "minutes". When the determination result of S918 is Yes, processing advances to S1001 in FIG. 11. When the determination result of S918 is No, in S919, the registering unit 108 determines whether or not the document type 303 is "specifications". When the determination result of S919 is Yes, processing advances to S1007 in FIG. 11. When the determination result of S919 is No, processing advances to S1013 in FIG. 11.

In S1001 in FIG. 11, the registering unit 108 divides the object document 113 into a plurality of chunks with overlap. Next, in S1002, the registering unit 108 generates the vector 119 of each chunk. Next, in S1003, the registering unit 108 extracts a conference name from a title of the object document 113. Next, in S1004 the registering unit 108 acquires the chunk ID 124 of previous/next minutes from the document DB 105 and adopts the acquired chunk ID 124 as the meta-index 122 corresponding to the vector 119 of the chunk of the object document 113. "Previous/next minutes" means previous minutes and/or next minutes. The "previous minutes" are minutes of which the document type 131 is "minutes" and a conference name is the same as the conference name of the object document 113 (for example, minutes corresponding to an entry including the keyword list 125 in which the same conference name is recorded), and latest minutes among minutes of which date and time of creation is older than date and time of creation of the object document 113. The "next minutes" are minutes of which the document type 131 is "minutes" and a conference name is the same as the conference name of the object document 113, and oldest minutes among minutes of which date and time of creation is newer than date and time of creation of the object document 113. Next, in S1005, for each chunk of the object document 113, the registering unit 108 registers the vector 119, the chunk ID 120, the document type 131, and the meta-index 122 in the vector DB 106. Next, in S1006, the registering unit 108 registers the fragment document (chunk) 123, the chunk ID 124, the document type 131, and the keyword list 125 (including the conference name extracted in S1003) in the document DB 105. Subsequently, processing advances to S1016.

In S1007 to S1010 in FIG. 11, the registering unit 108 performs same processing as S904 to S907. Next, in S1011, for each chunk of the object document 113, the registering unit 108 registers the fragment document (chunk) 123, the chunk ID 124, the keyword list 125, and the document type 131 in the document DB 105. Next, in S1012, for each chunk of the object document 113, the registering unit 108 registers the vector 119, the chunk ID 120, the document type 121, and the meta-index 122 (including the recorded chunk ID (link)) in the vector DB 106. Subsequently, processing advances to S1016.

In S1013 in FIG. 11, the registering unit 108 divides the object document 113 into a plurality of chunks with overlap and registers each chunk in the document DB 105. Next, in S1014, the registering unit 108 generates the vector 119 of each chunk and registers the vector 119 in the vector DB 106.

In addition, finally, in S1016, when there is a next document that has not been divided into chunks, the registering unit 108 adopts the next document as the object document and processing returns to S902.

As described above, according to the first embodiment, the candidate sentence 129 that is submitted to the LLM together with the question 126 is more likely to include explanations and the like of words in the command manual, and as a result, the likelihood of getting a comprehensible answer 130 even if the user is not familiar with terminology increases. In addition, since ease of reference of the command manual is improved, the likelihood of improving accuracy (quality) of the answer 130 (explanation) such as procedures for using commands increases.

A second embodiment will be described with reference to FIGS. 12 to 16. In doing so, differences from the first embodiment will be mainly described and descriptions of points in common with the first embodiment will be either omitted or simplified.

Figure 12:
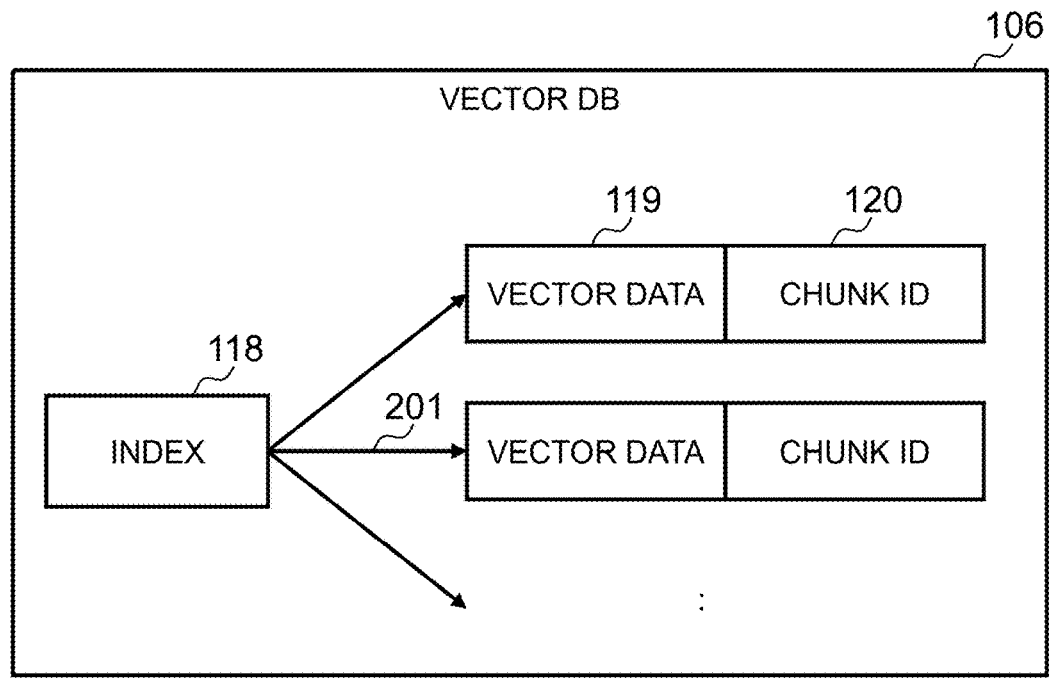
FIG. 12 is a configuration diagram of a vector DB according to a second embodiment.

FIG. 12 is a configuration diagram of the vector DB 106 according to the second embodiment.

As shown in FIG. 12, each entry does not include the document type 121 and the meta-index 122. Therefore, a neighborhood search using the embedding vector 127 returns only the found vector 119 and the chunk ID 120 thereof.

Figure 13:
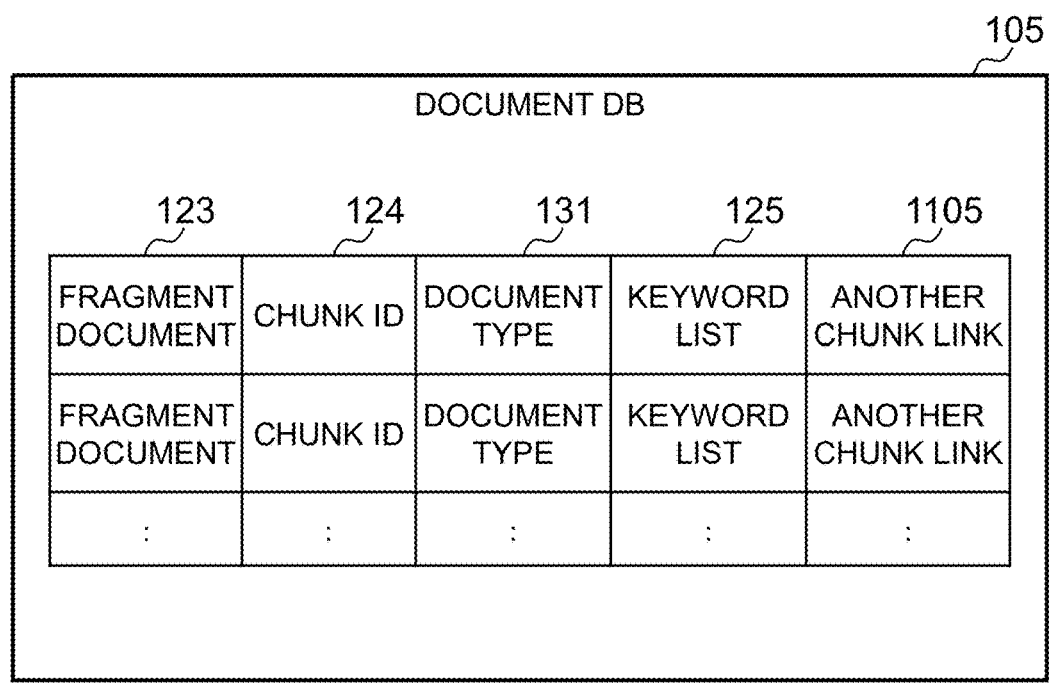
FIG. 13 is a configuration diagram of a document DB according to the second embodiment.

FIG. 13 is a configuration diagram of the document DB 105 according to the second embodiment.

Each entry of the document DB 105 includes another chunk link 1105. Another chunk link 1105 contains a chunk ID of another chunk. Accordingly, an entry with the chunk ID 124 that matches the chunk ID 120 acquired as a result of the neighborhood search can be identified, and a chunk (for example, the fragment document 123 or the explanatory text 503) corresponding to the chunk ID contained in another chunk link 1105 of the identified entry can be acquired.

Figure 14:
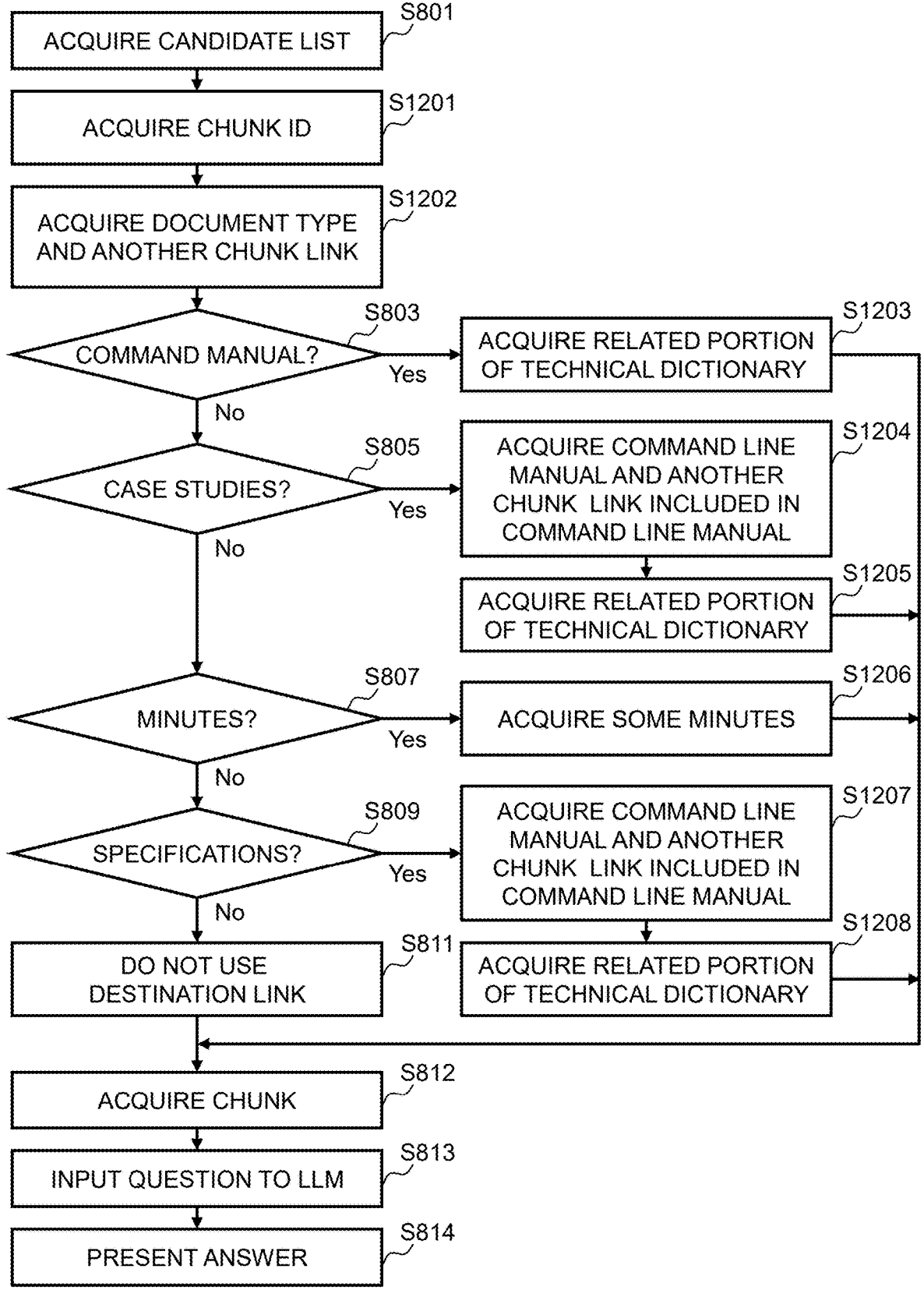
FIG. 14 is a flow chart of answer processing according to the second embodiment.

FIG. 14 is a flow chart of answer processing according to the second embodiment.

S1201 and S1202 are performed instead of S802. In S1201, the answering unit 107 acquires the chunk ID 120 from the candidate list 128 and, in S1202, the answering unit 107 acquires the document type 131 and another chunk link 1105 corresponding to the chunk ID 124 that matches the chunk ID 120 from the document DB 105.

S1203 is performed instead of S804. In S1203, the answering unit 107 acquires the chunk ID 502 included in another chunk link 1105 acquired in S1202 (the chunk ID 502 of the related portion (explanatory text 503) of the technical dictionary 115).

S1204 and S1205 are performed instead of S806. In S1204, the answering unit 107 acquires the chunk ID 402 included in another chunk link 1105 acquired in S1202 (the chunk ID 402 of the manual 403) and acquires another chunk link 1105 in an entry of the chunk ID 124 that matches the chunk ID 402. In S1205, the answering unit 107 acquires the chunk ID 502 included in another chunk link 1105 acquired in S1204 (the chunk ID 502 of the related portion (explanatory text 503) of the technical dictionary 115).

S1206 is performed instead of S808. In S1206, the answering unit 107 acquires the chunk ID included in another chunk link 1105 acquired in S1202 (the chunk ID of minutes of a previous/next session).

S1207 and S1208 are performed instead of S810. S1207 and S1208 are the same processing as S1204 and S1205.

Figure 15:
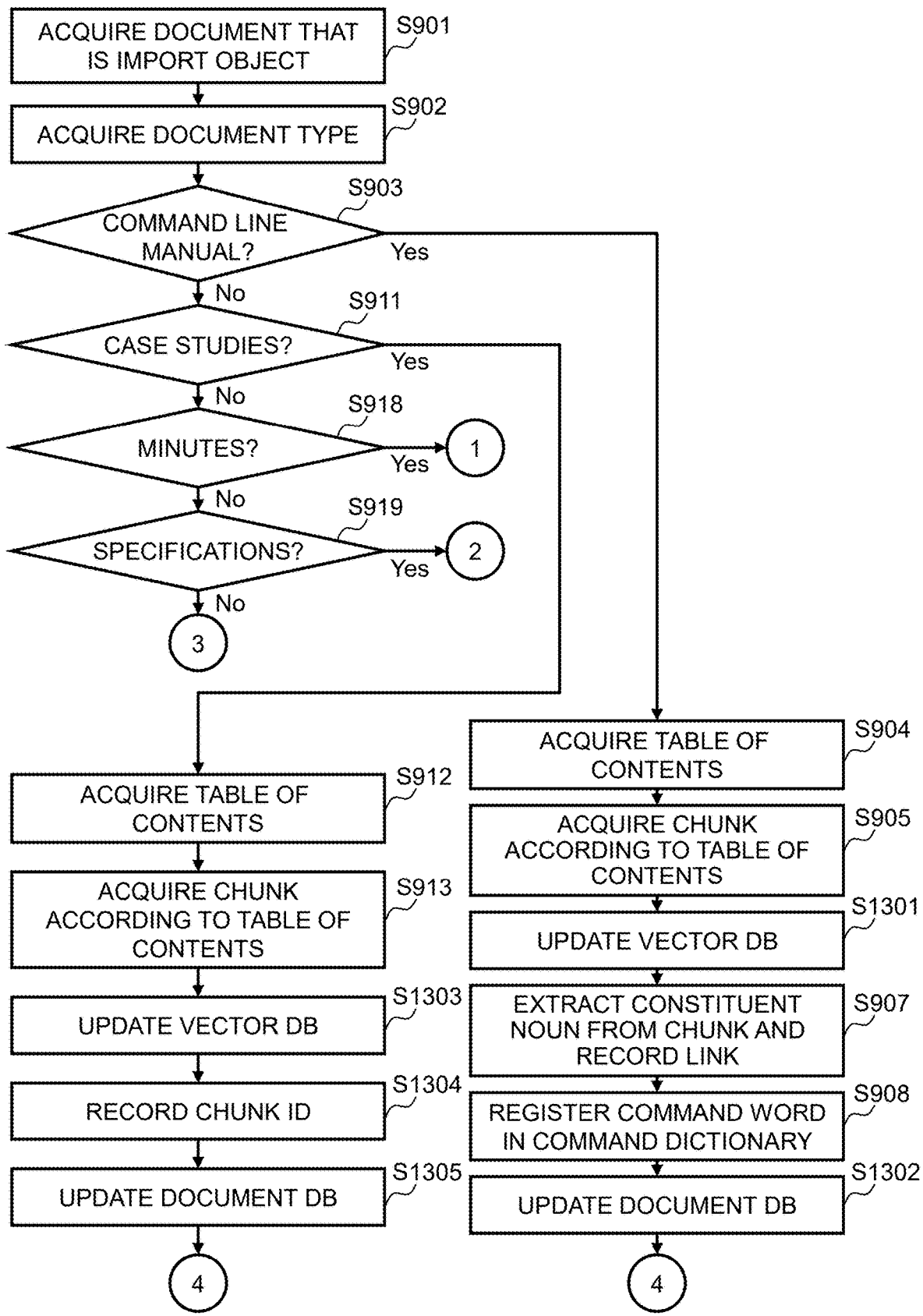
FIG. 15 is a part of a flow chart of registration processing according to the second embodiment.
Figure 16:
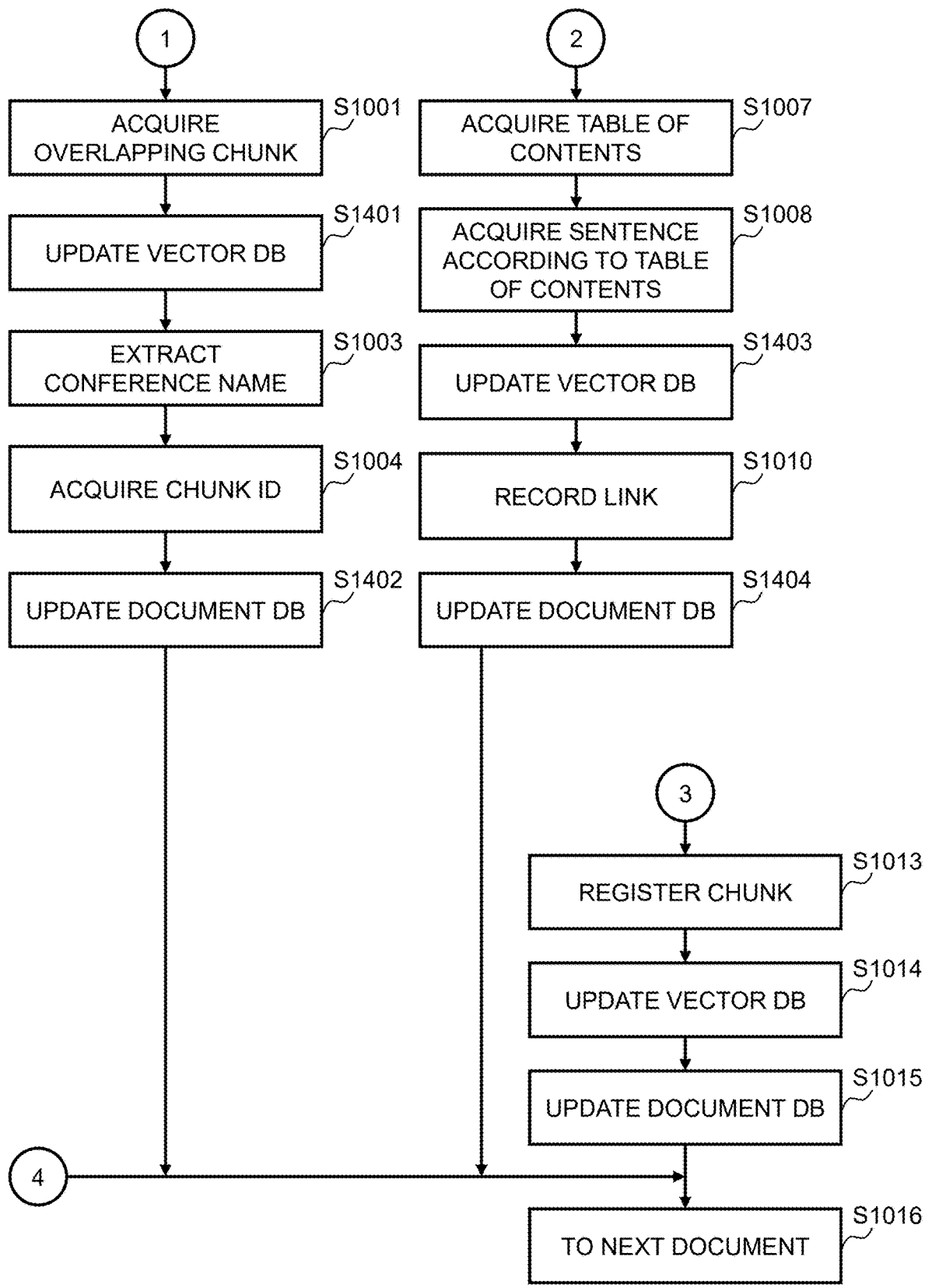
FIG. 16 is a remainder of the flow chart of registration processing according to the second embodiment.

FIGS. 15 and 16 are a flow chart of registration processing according to the second embodiment.

With respect to a command manual, S1301 is performed instead of S906, and S1302 is performed instead of S909 and S910. In S1301, the registering unit 108 registers the chunk ID 120 in the vector DB 106 together with the vector 119. In S1302, the registering unit 108 registers the fragment document (chunk) 123, the chunk ID 124, the keyword list 125, the document type 131, and another chunk link 1105 (including the chunk ID 502 (link) recorded in S907) in the document DB 105.

With respect to construction and operation guide case studies, S1303 to S1304 are performed instead of S915 to S917. In S1303, the registering unit 108 registers the chunk ID 120 in the vector DB 106 together with the vector 119. In S1304, with respect to each chunk, the registering unit 108 cuts out a keyword (for example, a noun) from the chunk, retrieves whether the keyword 401 matching the keyword is registered in the command dictionary 132, and if registered, records the chunk ID 402 (link) corresponding to the keyword 401. In S1305, the registering unit 108 registers the fragment document (chunk) 123, the chunk ID 124, the keyword list 125, the document type 131, and another chunk link 1105 (including the chunk ID 402 (link) recorded in S1304) in the document DB 105.

With respect to minutes, S1401 is performed instead of S1002, and S1402 is performed instead of S1005 and S1006. In S1401, the registering unit 108 registers the chunk ID 120 in the vector DB 106 together with the vector 119. In S1402, the registering unit 108 registers the fragment document (chunk) 123, the chunk ID 124, the keyword list 125 (including the conference name extracted in S1003), the document type 131, and another chunk link 1105 (including the chunk ID of the chunk of previous/next minutes) in the document DB 105.

With respect to specifications, S1403 is performed instead of S1009, and S1404 is performed instead of S1011 and S1012. In S1403, the registering unit 108 registers the chunk ID 120 in the vector DB 106 together with the vector 119. In S1404, for each chunk of the object document 113, the registering unit 108 registers the fragment document (chunk)

123, the chunk ID 124, the keyword list 125, the document type 131, and another chunk link 1105 (including the chunk ID (link) recorded in S1010) in the document DB 105.

By adopting the configuration described above, even in the second embodiment, the same advantageous effect as the first embodiment is achieved or, more specifically, the possibility of obtaining an answer 130 that is easy to understand even if the user is not familiar with technical terms is increased, and the possibility of improving the accuracy (quality) of the answer 130 (explanation) such as a procedure for using commands is also increased.

While several embodiments have been described above, the embodiments are merely examples for describing the present invention and are not intended to limit the scope of the present invention thereto. The present invention can also be implemented in various other modes.

For example, the description given above can be summarized as follows. The following summary may include supplementary descriptions of the description given above as well as descriptions of modifications.

The server 102 is constructed as an example of a system that supports question answering using an LLM. The server 102 can provide a chatbot, for example, to the client 101 as an application to support question answering using the LLM.

The system (for example, the server 102) includes a registering unit (for example, the registering unit 108) and an answering unit (for example, the answering unit 107).

The registering unit performs, for each document, (r1) to (r3) below. Note that the "determined overlap amount" may be the overlap amount itself or the presence or absence of an overlap.

(r1) The document is cut into a plurality of document chunks (for example, a plurality of fragment documents 123 or a plurality of manuals 403) according to an overlap amount corresponding to the document type of the document among overlap amounts determined for each of a plurality of document types, (r2) When the document type of the document is a predetermined document type (for example, a "command manual", "construction and operation guide case studies", or "specifications"), for each document chunk obtained by the cutting, if a word matching each of one or a plurality of words acquired from the document chunk is included in a dictionary (for example, the technical dictionary 115 or the command dictionary 132), the dictionary chunk is associated with a dictionary chunk (for example, the explanatory text 503 or the manual 403) that is a partial dictionary including a description related to the matching word.

(r3) For each document chunk constituting the document, the document chunk, a vector of the document chunk, and a chunk ID of the document chunk are registered in a database.

The answering unit performs (a1) to (a4) below.
(a1) A question from the user is received from a question source (for example, the client 101).
(a2) A vector in the neighborhood of a vector of the question is retrieved from a vector database (for example, the vector DB 106).
(a3) With respect to the vector found in (a2), a document chunk with a chunk ID (for example, the chunk ID 120) corresponding to the vector is identified and, when the identified document chunk is associated with a dictionary chunk, the dictionary chunk is identified.

(a4) By inputting the chunk identified in (a3) and the question to the LLM, an answer with respect to the question is generated and the generated answer is provided to the question source.

Accordingly, since the chunk that is input to the LLM together with the question has, in addition to the chunk found in a neighborhood search, a dictionary chunk if the dictionary chunk is associated with the chunk and chunk division according to an overlap amount based on a document type is performed, an improvement in accuracy (quality) of the answer obtained from the LLM with respect to the question is expected.

Note that in (a4), the chunk input to the LLM among the chunks identified in (a3) may be all of the chunks identified in (a3) or a part of the chunks identified in (a3).

In addition, the association of a chunk to a dictionary chunk may be realized by recording a chunk ID of the dictionary chunk in the meta-index 122 of the vector 119 of the chunk as illustrated in FIG. 2 or by recording the chunk ID of the dictionary chunk in another chunk link 1105 of the chunk as illustrated in FIG. 13. For example, the fact that chunks other than the chunk corresponding to the vector 119 found by a neighborhood search are identified in FIG. 2 or in FIGS. 12 and 13 means that the vector 119 that was not found by the neighborhood search can be regarded as substantially found and, therefore, improvement in the ease of reference of documents such as a command manual, construction and operation guide case studies, and specifications is expected.

The database may include a vector database (for example, the vector DB 106) and a document database (for example, the document DB 105). In (r3), the vector and the chunk ID may be registered in the vector database and the document chunk and the chunk ID may be registered in the document database. In (a2), the neighborhood vector may be retrieved from the vector database.

In (r1), when the document type of the document is a command manual of an object system related to a specific application (for example, a system related to the construction, operation, or use of a service in a company, a hospital, a government agency, or the like), construction and operation guide case studies of the object system, or specifications of the object system, an overlap amount corresponding to the document type is zero and the registering unit may cut the document into a plurality of chunks without overlap. This eliminates extra noise associated with overlap between chunks with low correlation, increasing the accuracy of neighborhood searches and, consequently, an improvement in the accuracy of answers is expected.

When the predetermined document type is a command manual, in (r1), the registering unit may cut the document into a plurality of chunks with no overlap according to an organization of chapters and/or an organization of sections identified from the table of contents of the document. In (r2), the dictionary may be a technical dictionary, and for each document chunk of the document and for each of one or a plurality of words acquired from the document chunk, if the technical dictionary includes a technical term matching the word, the document chunk may be associated with a dictionary chunk (for example, the explanatory text 503) including a description related to the technical term in the technical dictionary. Accordingly, when a vector of a chunk of the command manual is found by a neighborhood search and a dictionary chunk is associated with the chunk, since the chunk of the command manual and the dictionary chunk associated with the chunk are input to the LLM, an improvement in accuracy of an answer is expected. Note that when the predetermined document type is a command manual, in (r2), for each command word acquired from a document (a document as a command manual), the registering unit may record the command word in a command dictionary and record a chunk including the command word in the document in the command dictionary as a dictionary chunk. Accordingly, the command dictionary can be constructed in parallel with the registration of the document as a command manual.

The registering unit may be configured to perform (r1) to (r3) with respect to a document of which the document type is construction and operation guide case studies or specifications after performing (r1) to (r3) with respect to a document of which the document type is a command manual. In (r2) with respect to a document of which the document type is construction and operation guide case studies or specifications, for each document chunk of the document and for each of one or a plurality of words acquired from the document chunk, if a command word matching the word is included in the command dictionary, the registering unit may associate the document chunk with a dictionary chunk including a description related to the command word in the command dictionary. Accordingly, when a chunk found by a neighborhood search has a command word included in the command dictionary, since a dictionary chunk including the command word is associated with the found chunk, an improvement in accuracy of an answer is expected. In addition, in answer processing, when a chunk of construction and operation guide case studies or specifications is acquired, since an ID of a chunk of a command manual (hereinafter, the manual 403) is associated with the acquired chunk (specifically, for example, the meta-index 122 or another chunk link 1105 of the chunk), the manual 403 can be identified from the ID of the chunk, and since an ID of a chunk of a technical dictionary (hereinafter, the explanatory text 503) is associated with the manual 403 (specifically, the meta-index 122 or another chunk link 1105 corresponding to the manual 403), the explanatory text 503 can be acquired. Note that in the flow charts shown in FIGS. 10 and 11 and the flow charts shown in FIGS. 15 and 16, after performing processing of S903: Yes and thereafter with respect to all documents of which the document type is a "command manual" (for example, performing S1016 instead of performing S911 and thereafter when the document type is not a "command manual"), the registering unit 108 may perform processing of S911: Yes and thereafter with respect to all documents of which the document type is "construction and operation guide case studies" (for example, performing S1016 instead of performing S918 and thereafter when the document type is not "construction and operation guide case studies") or perform processing of S919: Yes and thereafter with respect to all documents of which the document type is "specifications".

When the predetermined document type is minutes, in (r1), the registering unit may cut the document into a plurality of document chunks according to an overlap amount corresponding to the document type so that consecutive document chunks partially overlap with each other, and in (r2), for each document chunk of the document, the registering unit may associate a document chunk of previous and/or next minutes of a conference to which minutes as the document belongs. Since overlap is provided between chunks with higher correlation than command manuals, construction and operation guide case studies, or specifications, the accuracy of neighborhood searches are increased and, consequently, an improvement in the accuracy of answers is expected.

The invention claimed is:

1. A system of supporting question answering using a large language model, comprising:
a registering unit and an answering unit, wherein
for each document, the registering unit:
(r1) cuts the document into a plurality of document chunks according to an overlap amount corresponding to a document type of the document among overlap amounts determined for each of a plurality of document types;
(r2) when the document type of the document is a predetermined document type, for each document chunk obtained by the cutting, if a word matching each of one or a plurality of words acquired from the document chunk is included in a dictionary, associates the dictionary chunk with a dictionary chunk that is a partial dictionary including a description related to the matching word; and
(r3) for each document chunk constituting the document, registers the document chunk, a vector of the document chunk, and a chunk ID of the document chunk in a database, and
the answering unit:
(a1) receives a question from the user from a question source;
(a2) retrieves a vector in the neighborhood of a vector of the question from the database;
(a3) with respect to each vector found in (a2), identifies a document chunk with a chunk ID corresponding to the vector and, when the identified document chunk is associated with a dictionary chunk, identifies the dictionary chunk; and
(a4) by inputting the chunk identified in (a3) and the question to the large language model, generates an answer with respect to the question and provides the question source with the generated answer.

2. The system according to claim 1, wherein
in (r1), when the document type of the document is a command manual of an object system related to a specific application, construction and operation guide case studies of the object system, or specifications of the object system, an overlap amount corresponding to the document type is zero and the registering unit cuts the document into a plurality of chunks without overlap.

3. The system according to claim 2, wherein
when the predetermined document type is the command manual,
in (r1), the registering unit cuts the document into a plurality of chunks with no overlap according to an organization of chapters and/or an organization of sections identified from a table of contents of the document, and
in (r2),
the dictionary is a technical dictionary, and
for each document chunk of the document and for each of one or a plurality of words acquired from the document chunk, if the technical dictionary includes a technical term matching the word, the registering unit associates the document chunk with a dictionary chunk including a description related to the technical term in the technical dictionary.

4. The system according to claim 3, wherein
when the predetermined document type is the command manual,
- in (r2), for each command word acquired from the document, the registering unit records the command word in a command dictionary and records a chunk including the command word in the document in the command dictionary as a dictionary chunk.

5. The system according to claim 4, wherein
the registering unit is configured to perform (r1) to (r3) with respect to a document of which the document type is the construction and operation guide case studies or the specifications after performing (r1) to (r3) with respect to a document of which the document type is the command manual, and
in (r2) with respect to a document of which the document type is the construction and operation guide case studies or the specifications, for each document chunk of the document and for each of one or a plurality of words acquired from the document chunk, if a command word matching the word is included in the command dictionary, the registering unit associates the document chunk with a dictionary chunk including a description related to the command word in the command dictionary.

6. The system according to claim 1, wherein
when the predetermined document type is minutes,
- in (r1), the registering unit cuts the document into a plurality of document chunks according to an overlap amount corresponding to the document type so that consecutive document chunks partially overlap with each other, and
- in (r2), for each document chunk of the document, the registering unit associates a document chunk of previous and/or next minutes of a conference to which minutes as the document belongs.

7. The system according to claim 1, wherein
the database includes a vector database and a document database,
- in (r3), the vector and the chunk ID are registered in the vector database and the document chunk and the chunk ID are registered in the document database, and
- in (a2), the neighborhood vector is retrieved from the vector database.

8. A method of supporting question answering using a large language model, comprising:
for each document, causing a computer to:
- (r1) cut the document into a plurality of document chunks according to an overlap amount corresponding to a document type of the document among overlap amounts determined for each of a plurality of document types;
- (r2) when the document type of the document is a predetermined document type, for each document chunk obtained by the cutting, if a word matching each of one or a plurality of words acquired from the document chunk is included in a dictionary, associate the dictionary chunk with a dictionary chunk that is a partial dictionary including a description related to the matching word;
- (r3) for each document chunk constituting the document, register the document chunk, a vector of the document chunk, and a chunk ID of the document chunk in a database;
- (a1) receive a question from a user from a question source;
- (a2) retrieve a vector in the neighborhood of a vector of the question from the database;
- (a3) with respect to each vector found in (a2), identify a document chunk with a chunk ID corresponding to the vector and, when the identified document chunk is associated with a dictionary chunk, identify the dictionary chunk; and
- (a4) by inputting the chunk identified in (a3) and the question to the large language model, generate an answer with respect to the question and provide the question source with the generated answer.

* * * * *